(12) United States Patent
Brierton

(10) Patent No.: US 8,066,460 B2
(45) Date of Patent: Nov. 29, 2011

(54) APPARATUS AND METHOD FOR CARGO LOADING SYSTEM

(76) Inventor: Dennis M. Brierton, Queen Creek, AZ (US)

( * ) Notice: Subject to any disclaimer, the term of this patent is extended or adjusted under 35 U.S.C. 154(b) by 0 days.

(21) Appl. No.: 12/861,758

(22) Filed: Aug. 23, 2010

(65) Prior Publication Data

US 2011/0020090 A1    Jan. 27, 2011

Related U.S. Application Data

(62) Division of application No. 11/706,828, filed on Feb. 12, 2007, now Pat. No. 7,780,385.

(51) Int. Cl.
 *B61D 45/00* (2006.01)
(52) U.S. Cl. .............................. 410/129; 410/80; 410/140
(58) Field of Classification Search ................... 410/129, 410/30, 84, 46, 410, 80; 211/8; 248/221.11, 248/222.11, 22.13
See application file for complete search history.

(56) References Cited

U.S. PATENT DOCUMENTS

| | | | | |
|---|---|---|---|---|
| 4,027,892 A | * | 6/1977 | Parks | ................................. 410/3 |
| 5,033,601 A | * | 7/1991 | Huber | ..................... 193/35 MD |
| 5,302,063 A | * | 4/1994 | Winsor | ............................ 410/30 |
| 5,533,604 A | * | 7/1996 | Brierton | ................... 193/35 MD |
| 7,137,764 B2 | * | 11/2006 | Johnson | ......................... 410/101 |
| 7,556,462 B2 | * | 7/2009 | Huber | .............................. 410/92 |
| 2005/0036849 A1 | * | 2/2005 | Kiester et al. | .................. 410/129 |

* cited by examiner

*Primary Examiner* — Glenn Dayoan
*Assistant Examiner* — Sunsurraye Westbrook
(74) *Attorney, Agent, or Firm* — Wright Law Group, PLLC; Mark F. Wright

(57) ABSTRACT

Disclosed herein is a unique system providing for the quick and efficient movement of cargo such as pallets, containerized loads, and the like while providing enhanced safety measures to reduce or eliminate some of the injuries that are typically associated with cargo transport. By deploying a cargo transport system constructed from a fiberglass cargo loading grid with one or more cargo restraining latches, the movement of cargo within the trailer or bed of the truck can be more efficiently restrained, thereby minimizing inadvertent exposure of personnel to accidents associated with the movement of the cargo and damage to the cargo during transport. The cargo restraining latch is a spring-loaded, multi-fingered mechanism that is selectively and removably inserted into a portion of the cargo transport system, thereby restraining any undesired movement of the cargo. Additionally, certain embodiments of the cargo transport system comprise a plurality of hinged folding panels with handles, providing an apparatus that is portable and reconfigurable, allowing for maximum flexibility.

19 Claims, 4 Drawing Sheets

னand which application is
APPARATUS AND METHOD FOR CARGO LOADING SYSTEM

RELATED APPLICATION

This application is a divisional of U.S. patent application Ser. No. 11/706,828, which application was filed on Feb. 12, 2007 now U.S. Pat. No. 7,780,385, and which application is now pending at the United States Patent and Trademark Office, and which patent application is incorporated herein by reference.

BACKGROUND OF THE INVENTION

1. Field of the Invention

The present invention relates generally to methods and systems for loading goods for transport and more particularly relates to a cargo loading system adaptable to multiple shipping requirements.

2. Background Art

The use of trucks and trailers to transport various goods "over the road" is well known to those skilled in the art. A steadily increasing volume of cargo is transported by truck trailer and must be loaded into the trailer at origin, unloaded from the trailer at freight terminals, and then sometimes reloaded on a local delivery truck and subsequently unloaded at its final destination point. Typically, a person or company will hire a transport company to pack, load, and then ship or store the desired goods. The shipping industry is a vital part of the nation's economy and provides a much-needed service for promoting effective and efficient commerce in this country.

Where possible, cargo is typically placed on pallets or skids that are carried by front-end loaders or forklifts and placed into truck trailers. While such loading is relatively fast, it possesses a notable risk factor for the operator and others who must operate the equipment in narrow, often poorly lighted trailers in close proximity to heavy objects that can easily fall or tip within the trailer. When the cargo is of a type impossible to handle with a front-end loader or one that is not easily shipped on pallets, the cargo must be loaded on the trailer by hand labor. In any event, the cargo is generally transferred from the loading dock to the trailer starting with the loading of the front end of the trailer and progressing towards the rear until the trailer has been filled to the doors at the rear cargo entrance, a distance of up to 53 feet.

While front-end loaders and forklifts are able to handle much of the work in loading trailers, workers are still commonly involved in the precise positioning of the cargo inside the trailer as it is loaded. To assist in the loading process, many trailer beds are configured with one or more roller transfer units or "roller" arrangement that allows the worker to slide the cargo or the cargo pallets around the interior of the trailer. For some applications, the rollers may also be embedded into the floor of the truck or embedded into platforms that are installed into the bed of the trailer to make loading cargo more rapid and efficient. One such roller transfer unit is described in U.S. Pat. No. 5,533,604, which patent is incorporated herein by reference.

While the use of roller devices is widely practiced, this practice is not without risk. With the workers and the forklifts working in tandem to load the cargo, a high element of risk is present when large and heavy loads of several thousand pounds are being loaded and positioned. In some applications, the load secured on a pallet may weigh as much as 15,000 pounds. It is not uncommon for a worker to be injured by a shifting pallet or load and accidents in which a workman is pinned against cargo or sidewalls or where cargo falls on him are not unusual. Additionally, the permanent installation of roller devices or roller transfer units into the bed of a trailer may be undesirable since it may limit the use of the trailer for subsequent types of cargo in applications where the roller transfer unit configuration is not optimal.

Once the cargo has been loaded into the trailer, with the roller transfer units or other similar devices in place, it is usually desirable to secure the cargo in place in order to prevent unwanted shifting of the cargo during transport. If the cargo is not restrained, it is possible that the cargo may shift during transport, damaging the cargo, the trailer, or both. In order to restrain or eliminate the movement of the cargo during transport, it is a common practice to employ various straps, cords, ropes, and the like to securely fasten the cargo containers to the sidewalls of the trailer. Once the trailer has arrived at the appropriate destination, the straps and cords can be removed to allow the cargo to be unloaded. When cargo is to be unloaded from the truck trailer at freight terminals or at the final destination point, the unloading process can present the same dangers and difficulties as those described above for loading.

Accordingly, it would be desirable to provide an apparatus for truck trailers and other cargo loading environments that can be easily configured and deployed in multiple and disparate sizes of trailers, while simultaneously reducing the possibility of injury to workers due to mishaps when loading and unloading the cargo.

SUMMARY OF THE INVENTION

Disclosed herein is a unique system providing for the quick and efficient movement of cargo such as pallets, containerized loads, and the like while providing enhanced safety measures to reduce or eliminate some of the injuries that are typically associated with cargo transport. By deploying a cargo transport system constructed from a fiberglass loading grid with one or more cargo restraining latches, the movement of cargo can be restrained, thereby minimizing inadvertent exposure of personnel to accidents associated with the movement of the cargo. The cargo restraining latch is a spring-loaded, multi-fingered mechanism that is selectively and removably inserted into a portion of the cargo transport system, thereby restraining any undesired movement of the cargo. Additionally, certain embodiments of the cargo transport system comprise a plurality of hinged folding panels with handles, providing an apparatus that is portable and reconfigurable, allowing for maximum flexibility.

BRIEF DESCRIPTION OF THE DRAWINGS

The preferred embodiments of the present invention will hereinafter be described in conjunction with the appended wherein like designations denote like elements and.

DETAILED DESCRIPTION

Disclosed herein is a unique system providing for the quick and efficient movement of cargo such as pallets, containerized loads, and the like while providing enhanced safety measures to reduce or eliminate some of the injuries that are typically associated with cargo transport. By deploying a cargo transport system constructed from a fiberglass cargo loading grid with one or more cargo restraining latches, the movement of cargo within the trailer or bed of the truck can be more efficiently restrained, thereby minimizing inadvertent exposure of personnel to accidents associated with the movement of the cargo and damage to the cargo during transport. The cargo restraining latch is a spring-loaded, multi-fingered mechanism that is selectively and removably inserted into a portion of the cargo transport system, thereby restraining any undesired movement of the cargo. Additionally, certain embodiments of the cargo transport system comprise a plurality of hinged folding panels with handles, providing an apparatus that is portable and reconfigurable, allowing for maximum flexibility.

Figure 1:
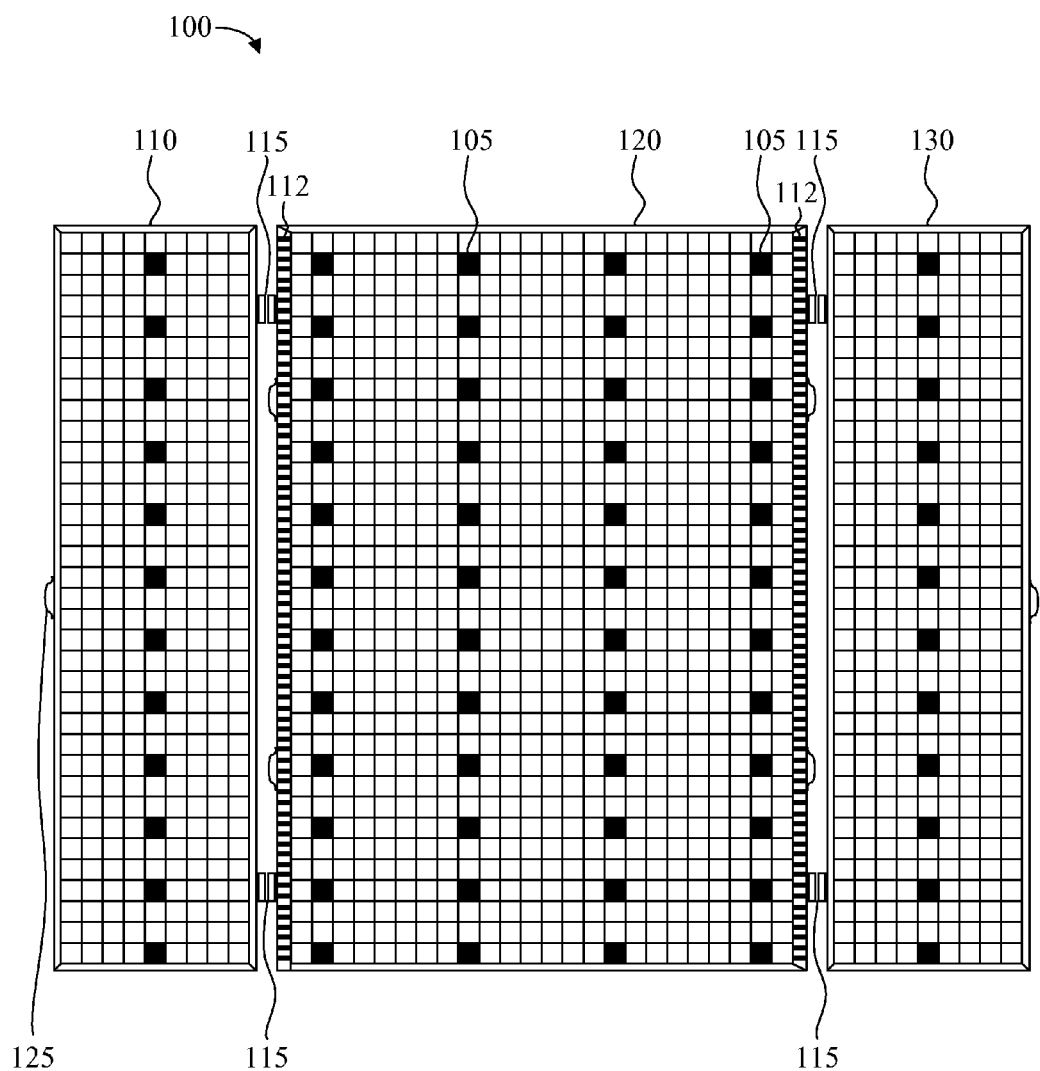
FIG. 1 is a plan view of a cargo loading grid in accordance with a preferred exemplary embodiment of the present invention.

Referring now to FIG. 1, a cargo loading grid 100 in accordance with a preferred exemplary embodiment of the present invention comprises at least one or more mats or prismatic grids that are specifically designed for moving cargo along a surface, such as a loading dock or the interior of a trailer. In the most preferred embodiments of the present invention, cargo loading grid 100 comprises: a panel 110; a panel 120; and a panel 130. Panels 110, 120, and 130 are joined by a plurality of hinges 115. At least one ladder-like assembly 112 is positioned along an edge of panel 120. Additionally, at least one handle 125 is most preferably attached to at least one of panels 110, 120, and 130. In the most preferred embodiment of the present invention comprises a plurality of roller transfer units 105 removably inserted into certain portions of each of panels 110, 120, and 130.

Panels 110, 120, and 130 are most preferably fabricated from a durable lightweight material. For the most preferred embodiments of the present invention, panels 110, 120, and 130 are fabricated from a preformed fiberglass grid, with apertures or openings sized to receive one or more roller transfer units 105. In the most preferred embodiments of the present invention, the apertures or openings are substantially rectangular and in the range of 1.5 inches to 2.5 inches, with 1.78 inches being the most preferred embodiment. The overall size of panels 110, 120, and 130 will be determined by the specific requirements of a given application. For example, at least one preferred embodiment of the present invention will employ panels 110, 120, and 130 of a size and shape (i.e., length and width) specifically designed to fit inside a standard shipping trailer and cover the floor of the trailer from side-to-side. The depth of panels 110, 120, and 130 will be determined by the clearance necessary to provide for the insertion of one or more roller transfer units 105. Finally, by connecting panel 110, 120, and 130 to each other with hinges 115, cargo loading grid 100 may be folded for easy transport, installation, removal, and storage.

Roller transfer units 105 are most preferably roller assemblies that are removably inserted into strategic locations in the grid openings in panels 110, 120, and 130, thereby providing a roller surface to enable cargo to be rolled into position with minimal effort. Any suitable roller transfer units may be employed in the various preferred embodiments of the present invention with the most preferred embodiments of the present invention incorporating roller transfer units of the type disclosed in U.S. Pat. No. 5,533,604. The exact number and placement of roller transfer units 105 will be determined by the specific requirements of a given application.

One or more handles 125 are strategically positioned along the outer edges of panels 110, 120, and 130, thereby providing a means for folding panels 110 and 130 over panel 120 and for lifting and transporting cargo loading grid 100. The most preferred embodiments of the present invention may comprise multiple handles 125 along the outer perimeter of panels 110 and 130. These handles 125 may be used for folding panels 110 and 130 over panel 120. Additional handles 125 will be fastened to the outer perimeter of panel 120 and may be used to transport cargo loading grid 100 when panels 110 and 130 are folded over panel 120. Handles 125 may be attached to panels 110, 120, and 130 by any means known to those skilled in the art including rivets, bolts, screws and the like. Any suitable method of securely attaching handles 125 to panels 110, 120, and 130 will be considered within the scope of the present invention.

Ladder-like assemblies 112 comprise a series of rods that are affixed to the outer edge or frame of panel 120. In the most preferred embodiments of the present invention, the rods are fabricated from a durable, corrosion resistant metal. The rods are evenly spaced and sized to accommodate one or more cargo restraining latches (not shown this FIG.). The use and deployment of cargo restraining latches is set forth in conjunction with FIG. 2 and FIG. 3 below.

Figure 2:
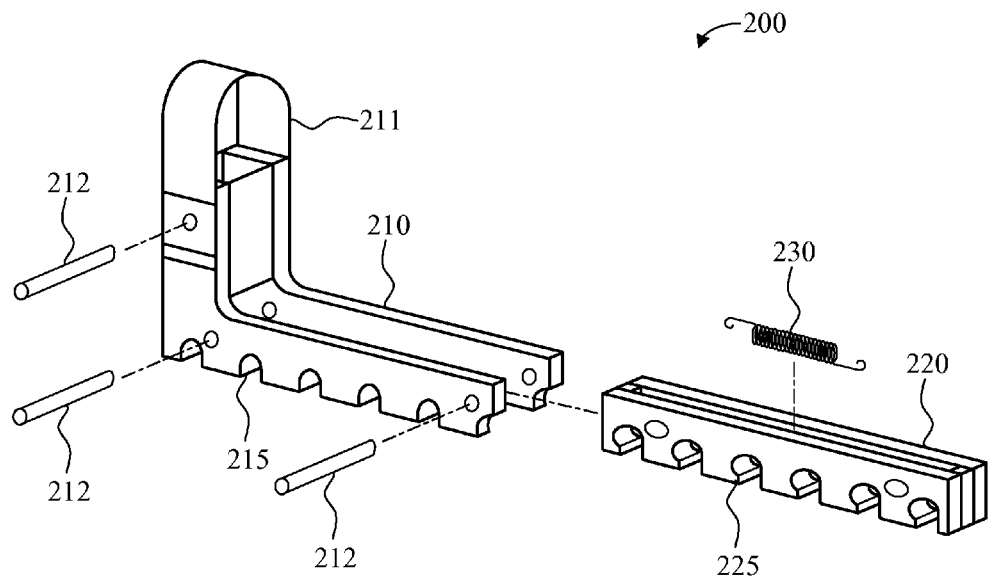
FIG. 2 is an exploded view of a cargo restraining latch in accordance with a preferred exemplary embodiment of the present invention.

Referring now to FIG. 2, an exploded view of a cargo restraining latch 200 in accordance with a preferred exemplary embodiment of the present invention is presented. Cargo restraining latch 200 is most preferably a spring-loaded fingered mechanism that may be selectively and removably coupled to ladder-like assemblies 112 of cargo loading grid 100 of FIG. 1. By selectively inserting one or more cargo restraining latches 200 into cargo loading grid 100 of FIG. 1, the movement of cargo being loaded or moved into position can be constrained, thereby reducing the possibility of injury to workers.

Each cargo restraining latch 200 most preferably comprises a housing 210 and an insert 220 that work in concert to selectively connect each cargo restraining latch 200 to the desired placement on cargo loading grid 100 of FIG. 1. Insert 220 is inserted into housing 210 and held in place by pins 212 and spring 230. Insert 220 is most preferably fabricated with a plurality of "fingers" or "teeth" 225. Spring 230 allows insert 220 to move horizontally along a limited length fixed path within housing 210 while vertical movement is restrained by pins 212 which pass through apertures in the body of insert 220. In the most preferred embodiments of the present invention, insert 220 and housing 210 are most preferably fabricated from a durable, corrosion-resistant metal. Certain plastics may also be used.

In certain preferred embodiments of the present invention, housing 210 may also include a strap 211 that is used to facilitate the carrying of cargo restraining latch 200 from place to place. Additionally, strap 211 may be used to remove cargo restraining latch 200 from ladder-like assemblies 112 of FIG. 1 after use. Strap 211 may be affixed to housing 210 using any suitable means known to those skilled in the art.

One possible method for attaching strap 211 to housing 210 is with a pin 212 that is inserted through housing 210. While the inclusion of strap 211 is optional, the most preferred embodiments of the present invention will comprise a strap 211 to allow for the smooth and efficient removal of cargo restraining latch 200 from cargo loading grid 100 of FIG. 1 after use.

Pins 212 are fasteners used to secure the various components of cargo restraining latch 200 together, thereby forming a unitary apparatus. Pins 212 may be any type of suitable fastener known to those skilled in the art. This includes rivets, bolts, cotter pins, and the like. Pins 212 are most preferably fabricated from a durable, metallic rust-resistant material. Certain plastics may also be used.

Figure 3:
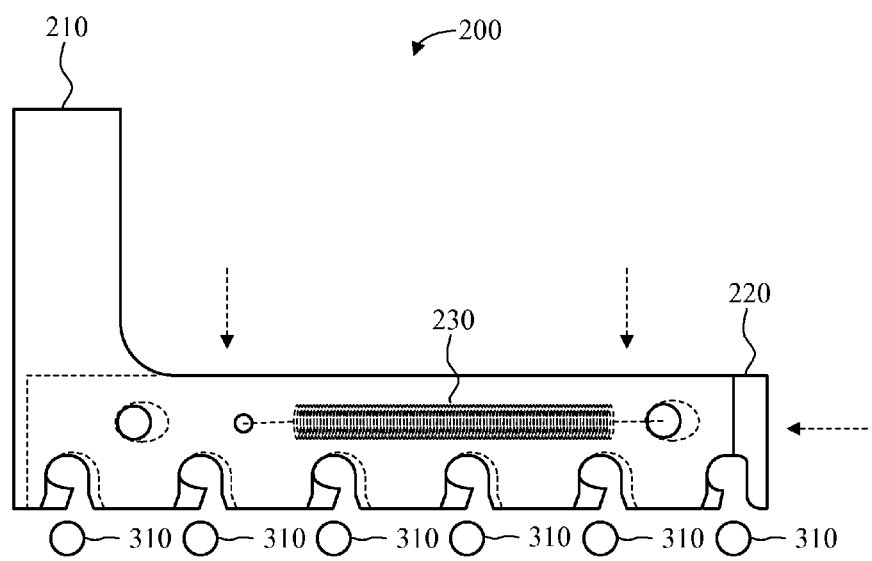
FIG. 3 is a side view of a cargo restraining latch in accordance with a preferred exemplary embodiment of the present invention.

Referring now to FIG. 3, a side view of cargo restraining latch 200 in accordance with a preferred exemplary embodiment of the present invention illustrates the horizontal movement of slide 220 within housing 210. As cargo restraining latch is positioned over a series of rods 310 of ladder-like assemblies 112 of FIG. 1, the downward pressure against fingers 225 of spring-loaded slide 220 will cause fingers 225 of slide 220 to be displaced in a lateral direction, thereby permitting cargo restraining latch 200 to move downward, with fingers 225 of spring-loaded slide 220 eventually engaging rods 310. The lateral movement of slide 220 will also displace one end of spring 230, thereby creating a tension in spring 230. Once the surface of housing 210 has fully contacted rods 310, the tension in spring 230 will be released and slide 220 will "snap back" or return to its original position with fingers 225 of slide 220 now fully engaging rods 310.

Once installed, the horizontal portion of cargo restraining latch 200 is substantially co-planar with the surface of cargo loading grid 100 of FIG. 1. The vertical portion of cargo restraining latch 200 extends vertically above the surface of cargo loading grid 100 of FIG. 1, thereby acting as a restraint for further movement of cargo once the cargo rests against the vertical portion of cargo restraining latch 200. With judicious placement of multiple cargo restraining latches 200, inadvertent movement of the cargo can be minimized and controlled to a significant extent.

Figure 4:
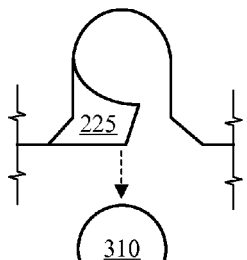
FIG. 4-6 are partial side views of the installation of a cargo restraining latch in accordance with a preferred exemplary embodiment of the present invention.
Figure 5:
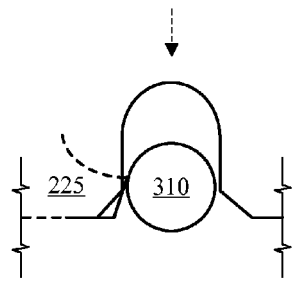
Figure 6:
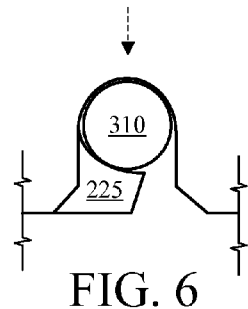

Referring now to FIG. 4-FIG. 6, a more detailed view of the process of engaging a rod 310 with a finger 225 in accordance with a preferred exemplary embodiment of the present invention is depicted. FIG. 4 shows the initial relationship of rod 310 to finger 225 while FIG. 5 shows the lateral movement of finger 225 resulting from the downward pressure exerted on cargo restraining latch 200 as described above in conjunction with FIG. 2. The lateral movement of finger 225 corresponds to the lateral movement of slide 220 of FIG. 2, thereby allowing rod 310 to be "locked" into position as shown in FIG. 6. With the most preferred embodiments of the present invention, the use of multiple fingers 225 to engage multiple rods 310 provides for a secure installation of cargo restraining latch 200.

Figure 7:
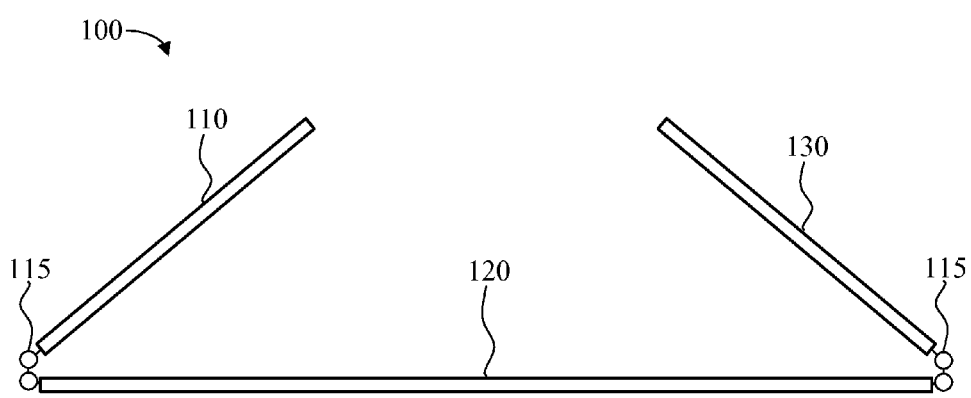
FIG. 7 is a side view of a partially folded cargo loading system in accordance with a preferred exemplary embodiment of the present invention.

Referring now to FIG. 7, the folding of a cargo loading grid 100 in accordance with a preferred exemplary embodiment of the present invention is depicted. As shown in FIG. 7, panels 110 and 130 are rotated towards each other about the hinge points formed by hinges 115.

Figure 8:
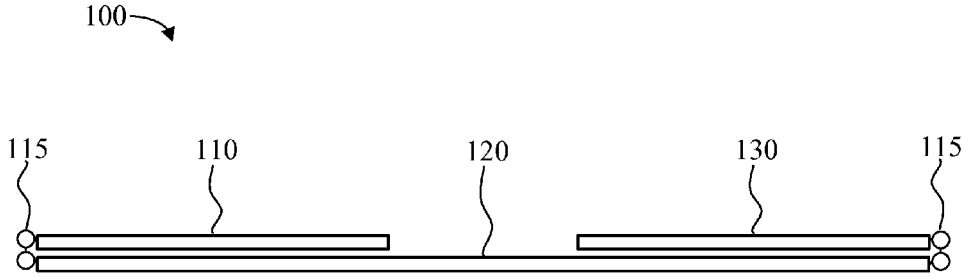
FIG. 8 is a side view of a fully folded cargo loading system in accordance with a preferred exemplary embodiment of the present invention.

Referring now to FIG. 8, a fully folded cargo loading grid 100 in accordance with a preferred exemplary embodiment of the present invention is depicted. As shown in FIG. 8, panels 110 and 130 have been fully rotated and now rest on panel 120. In this configuration, cargo loading grid 100 can be easily transported or carried, by using one or more handles 125 of FIG. 1 (not shown this FIG.). Once the folded cargo loading grid 100 has been placed inside a trailer, panels 110 and 130 can be returned to the extended configuration, thereby providing a larger cargo loading surface. Once cargo loading grid 100 has been placed inside the trailer and panels 110 and 130 have been extended, one or more cargo restraining latches 200 can be installed in the desired locations, thereby restraining the cargo. Additionally, the folded configuration shown in FIG. 8 allows for more compact storage of multiple cargo loading grids 100.

Figure 9:
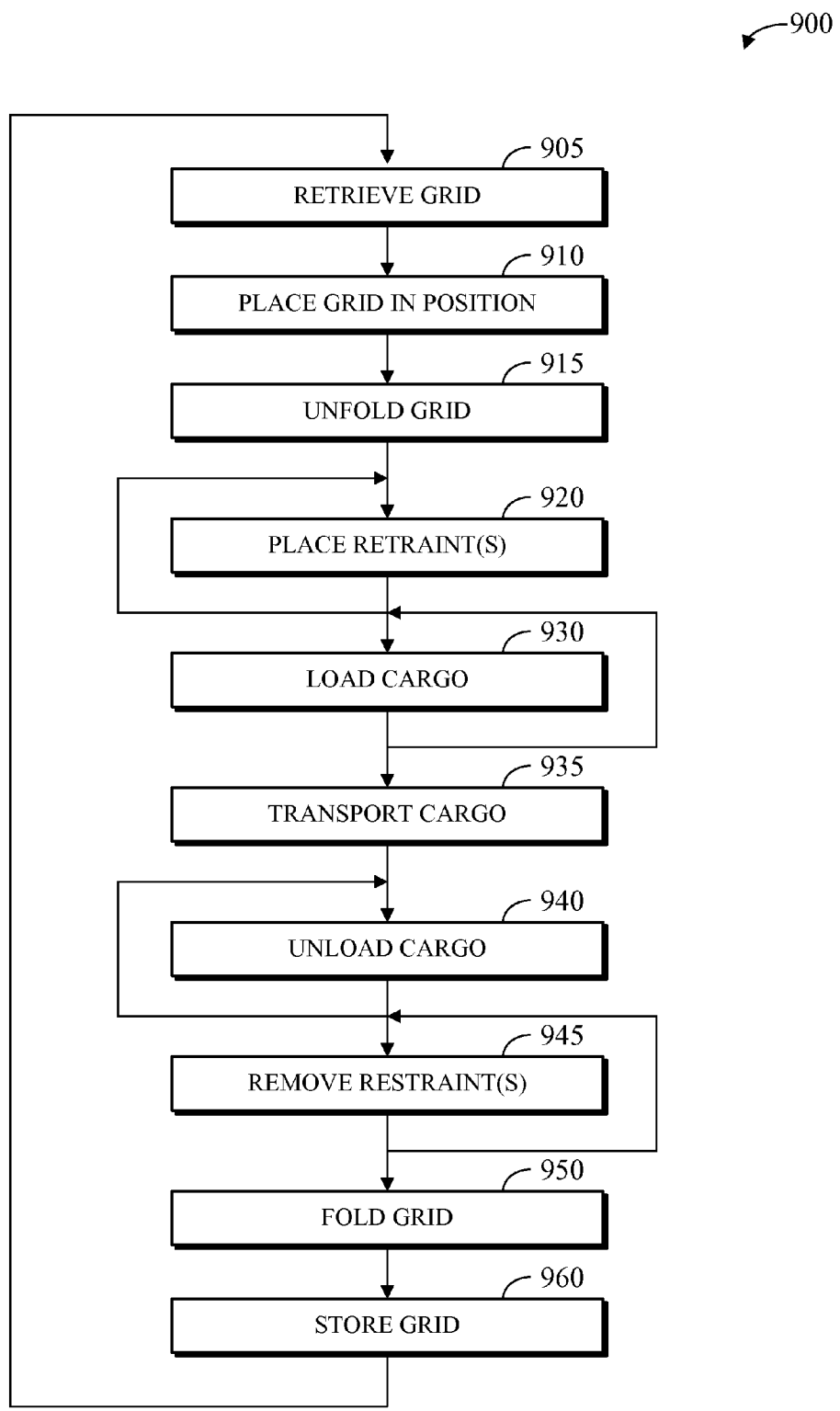
FIG. 9 is a flow chart for a method of using a cargo loading system in accordance with a preferred exemplary embodiment of the present invention.

Referring now to FIG. 9, a method 900 for using a cargo loading system in accordance with a preferred exemplary embodiment of the present invention is explained. The specific embodiment set forth in conjunction with method 900 is adapted for deploying a portable cargo loading grid, such as the one described in conjunction with FIG. 1 and used in conjunction with one or more cargo restraining latches 200 such as those described in conjunction with FIG. 2 and FIG. 3.

As shown in FIG. 9, the cargo loading grid is retrieved (step 905) whenever cargo is to be loaded using the preferred embodiments of the present invention. Next, the cargo loading grid can be positioned in the desired location (step 910). In the most preferred embodiments of the present invention, the cargo loading grid will be positioned in the bed of a standard tractor-trailer rig. If the cargo loading grid has been stored in a folded configuration, then the cargo loading grid will be unfolded in place (step 915). By using a folded cargo loading grid, the cargo loading grid can be more easily lifted into the trailer and positioned for use.

Once the cargo loading grid has been positioned, if roller transfer units are not already installed into the apertures formed by the grid-like panels, the roller transfer units may be installed into one or more apertures. In certain applications, the roller transfer units will be pre-installed into the apertures formed by the grid-like panels.

Additionally, the workers may begin to place cargo restraining latches in place (step 920) or, load the cargo onto the cargo loading grid (step 930). In some instances, the workers may install the cargo restraining latches prior to loading the cargo. In other situations, it may be advisable to load some of the cargo and then install cargo restraining latches. In most situations, as shown by the arrows in FIG. 9, the process of loading cargo and installing the cargo restraining latches will proceed in an alternating fashion as necessary to effectively and efficiently load the cargo.

Once the cargo has been loaded and secured, the cargo will be transported (step 935) and the process can be reversed to unload the cargo from the trailer (step 940) and to remove the cargo restraining latches (step 945). As with the loading process, it is anticipated that the process of unloading the cargo and removing the cargo restraining latches may be performed in a variety of sequences, all of which are contemplated herein. Once the cargo has been unloaded, the cargo loading grid may be folded (step 950) and removed for storage (step 960).

Additionally, while the various preferred exemplary embodiments of the present invention have been described in the context of a portable system, those skilled in the art will recognize that various preferred embodiments of the present invention may be installed in a more permanent or semi-permanent fashion as well. In these embodiments, the cargo loading grid could be mounted on a loading dock or installed into a trailer. The cargo restraint latches could be stored near the loading dock or inside the trailer, being installed into the cargo loading grid whenever and in whatever location may be necessary for a particular cargo. After use, the cargo restraining latches are removed from the cargo loading grid and stored away for future use. In this fashion, the present invention may be deployed in a more permanent fashion. Similarly, the specific size of the cargo loading grid is not limited by any specific embodiment set forth herein. While the most preferred embodiment of the present invention contemplates a series of panels that are sized to fit in a standard trailer, other sizes may be deployed for other applications. For example, a loading dock could use a series of cargo loading grids in order to facilitate transporting cargo.

Lastly, it should be appreciated that the illustrated embodiments are preferred exemplary embodiments only, and are not intended to limit the scope, applicability, or configuration of the present invention in any way. Rather, the foregoing detailed description provides those skilled in the art with a convenient road map for implementing a preferred exemplary embodiment of the present invention. Accordingly, it should be understood that various changes may be made in the function and arrangement of elements described in the exemplary preferred embodiments without departing from the spirit and scope of the present invention as set forth in the appended claims.

The invention claimed is:

1. A method comprising the steps of:
   a) positioning a cargo restraining latch over at least one panel, said at least one panel comprising:
      a frame, said frame comprising a perimeter;
      a plurality of substantially rectangular apertures formed in said panel; and
      a plurality of rods affixed to said perimeter of said frame;
   b) exerting a downward pressure on said cargo restraining latch, thereby actuating a spring-loaded fingered mechanism positioned within said cargo restraining latch and thereby engaging said plurality of rods with said spring-loaded fingered mechanism; and
   c) releasing said downward pressure on said cargo restraining latch, thereby removably coupling said cargo restraining latch to said at least one panel.

2. The method of claim 1 wherein steps a, b, and c are repeated for a plurality of cargo restraining latches.

3. The method of claim 1 wherein said cargo restraining latch further comprises a strap.

4. The method of claim 1 wherein said at least one panel further comprises at least one roller transfer unit, said at least one roller transfer unit being removably inserted into at least one of said plurality of substantially rectangular apertures.

5. The method of claim 1 wherein said at least one panel comprises a fiberglass panel.

6. The method of claim 1 further comprising at least one handle affixed to said panel.

7. The method of claim 1 further comprising the steps of:
   d) actuating said spring-loaded fingered mechanism to disengage said spring-loaded fingered mechanism from said plurality of rods; and
   e) lifting said cargo restraining latch away from said panel, thereby, removing said cargo restraining latch from said panel.

8. The method of claim 7 wherein steps d and e are repeated for a plurality of cargo restraining latches.

9. The method of claim 7 wherein said step of lifting said cargo restraining latch away from said panel comprises the steps of:
   grasping a strap affixed to said cargo restraining latch; and
   lifting said cargo restraining latch away from said panel.

10. A method comprising the steps of:
   (a) positioning at least one cargo restraining latch over a cargo transport system, said cargo transport system comprising:
      a first panel, said first panel comprising:
         a frame;
         a plurality of substantially rectangular apertures formed in said panel; and
         a plurality of rods affixed to a perimeter of said frame;
      a second panel, said second panel being connected to said first panel by at least a first hinge, said second panel comprising:
         a second frame; and
         a plurality of substantially rectangular apertures formed in said second panel;
      a third panel, said third panel being connected to said first panel by at least a second hinge, said third panel comprising:
         a third frame; and
         a plurality of substantially rectangular apertures formed in said third panel;
   b) exerting a downward pressure on said at least one cargo restraining latch, thereby actuating a spring-loaded fingered mechanism positioned within said cargo restraining latch and thereby engaging said plurality of rods of at least one of said first panel, said second panel, and said third panel with said spring-loaded fingered mechanism; and
   c) releasing said downward pressure on said at least one cargo restraining latch, thereby removably coupling said at least one cargo restraining latch to at least one of said of said first panel, said second panel, and said third panel.

11. The method of claim 10 wherein each of said at least a first hinge and said at least a second hinge comprise a plurality of hinges.

12. The method of claim 10 further comprising the steps of:
   actuating said spring-loaded fingered mechanism of said at least one cargo restraining latch to disengage said spring-loaded fingered mechanism from said plurality of rods for said at least one of said first panel, said second panel, and said third panel and
   lifting said at least one cargo restraining latch away from at least one of said first panel, said second panel, and said third panel, thereby, removing said at least one of said cargo restraining latch from at least one of said of said first panel, said second panel, and said third panel.

13. The method of claim 10 wherein said at least one cargo restraining latch comprises a plurality of cargo restraining latches.

14. The method of claim 10 further comprising a plurality of roller transfer units being removably inserted into a plurality of said substantially rectangular apertures in at least one of said first panel, said second panel, and said third panel.

15. The method of claim 10 wherein each of said first panel, said second panel, and said third panel comprises a fiberglass panel.

16. The method of claim 10 wherein at least one of said first panel, said second panel, and said third panel comprises a handle.

17. The method of claim 10 wherein each of said first panel, said second panel, and said third panel comprises a fiberglass panel and wherein at least one of said first panel, said second panel, and said third panel comprises a handle.

18. The method of claim 10 wherein said at least one cargo restraining latch comprises:
   a housing;
   a spring-loaded insert being moveably positioned inside said housing, said spring-loaded insert comprising a compression spring and plurality of fingers; and
   a strap affixed to said housing.

19. The method of claim 10 wherein said at least one cargo restraining latch comprises:

an L-shaped housing;
an insert; and
a compression spring, said compression spring being affixed to said insert, said compression spring being configured to provide for horizontal movement of said insert within said L-shaped housing.

* * * * *